Patented Oct. 31, 1933

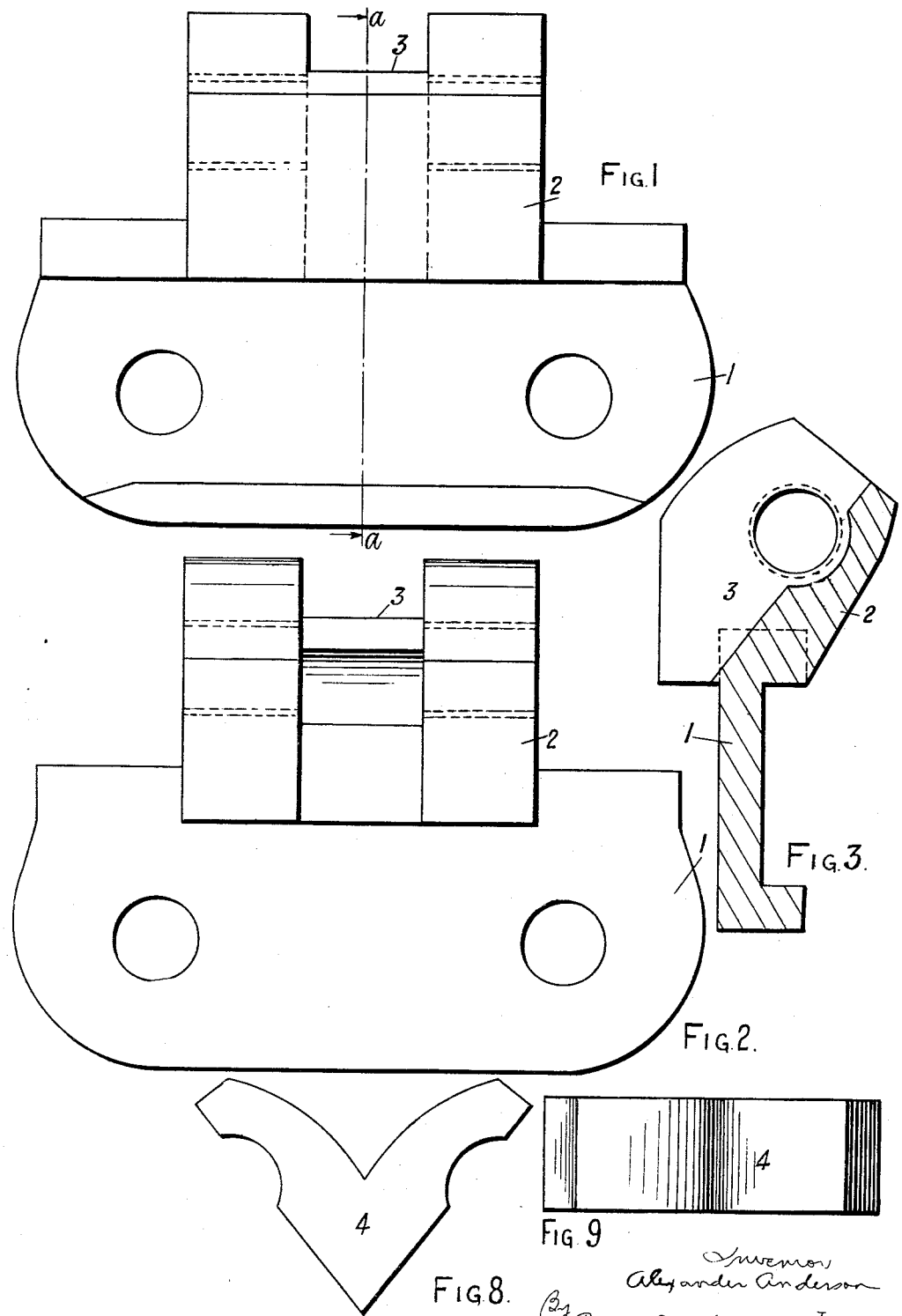

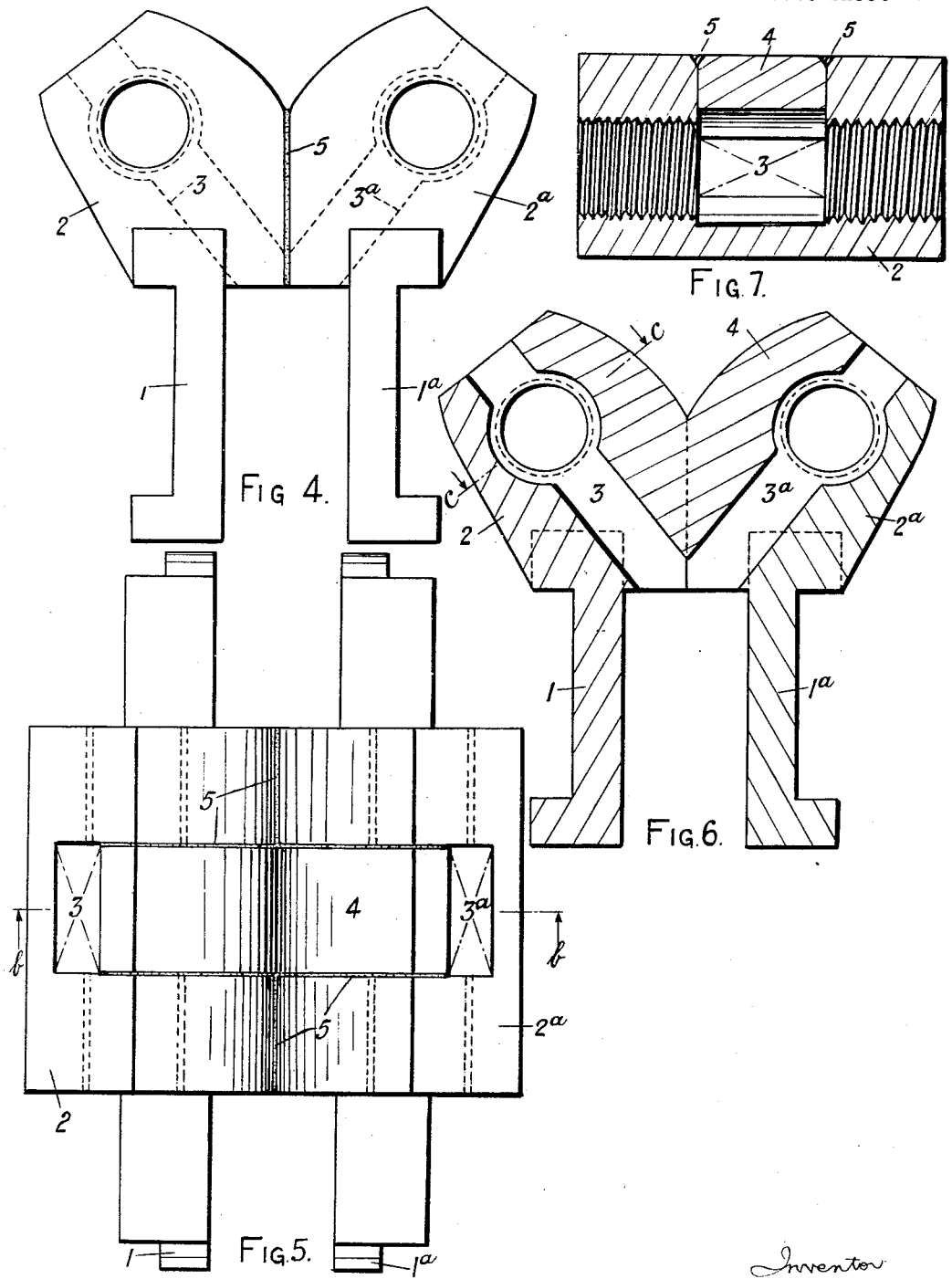

1,932,948

UNITED STATES PATENT OFFICE 1,932,948

CUTTER CHAIN FOR COAL-CUTTING MACHINES

Alexander Anderson, Motherwell, Scotland, assignor to Anderson, Boyes & Company Limited, Motherwell, Scotland, a company of Great Britain Application March 20, 1933, Serial No. 661,658, and in Great Britain January 17, 1933

2 Claims. (Cl. 262—33)

This invention relates to cutter-chains for coal-cutting machines of the type in which each pick-carrying block comprises side plates united by a bridge portion which, being formed with pick-receiving sockets, constitutes a pick box.

In the specification of my co-pending patent application No. 661,657 there is described a pick-carrying block for a cutter-chain designed to receive a single pick and comprising a bridge member integral with a side plate and formed by a machining operation such as a millling or equivalent operation with a notch which affords the inner walls of a pick-receiving socket of rectangular or non-circular cross section, an associated side plate formed with an integral horn accommodated in the notch so as to fill the open side of the notch and to constitute the outer wall of the pick-receiving socket, and welds uniting the associated side plate with the bridge member which extend along the adjoining inner edges of the bridge member and the side plate incorporating the horn and along the outer boundaries of the notch and the adjoining edges of the horn.

The present invention is concerned with pick-carrying blocks of the type which are designed to receive two picks which are inclined to one another and are disposed obliquely of the associated side plates.

The invention provides a pick-carrying block for cutter-chains comprising two side plates each formed integral with a half bridge member which is formed by a machining operation, such as a milling operation, with a notch affording the inner wall or walls of a pick-receiving socket of non-circular cross section, a preferably V-shaped notch-closing member accommodated in the notches so as to form the outer wall of each socket and to bridge the said members, and welds uniting the half bridge members and connecting the notch-closing member with the half bridge members.

The invention is illustrated in the drawings in which Figs. 1 and 2 are elevations at 180 degrees to each other of one side plate constituting one half of the pick-carrying block, Fig. 3 a transverse section on the line $a$—$a$ of Fig. 1, Fig. 4 an end elevation and Fig. 5 a plan view of a complete block, Fig. 6 a transverse section on the line $b$—$b$ of Fig. 5, Fig. 7 a section on the line $c$—$c$ of Fig. 6, and Figs. 8 and 9 an elevation and a plan view, respectively, of the V-shaped closing member.

The pick-carrying block shown comprises two side plates 1, 1$^a$ each formed integral with a half bridge member 2, 2$^a$. Formed in each half bridge member by a machining operation, such as a milling operation, is a notch 3, 3$^a$ which presents the inner walls of a pick-receiving socket of rectangular cross section. A V-shaped notch-closing member 4 is accommodated in the notches and bridges the members 2, 2$^a$ and forms the outer walls of the sockets. Welds indicated at 5 unite the half bridge members and connect the notch-closing member with the members 2, 2$^a$.

The sockets are shown as rectangular in cross section. It will be understood that they may be of any convenient non-circular cross section, i. e., they may be of oval cross section.

I claim:

1. A pick-carrying block for the cutter-chains of coal-cutting machines comprising, in combination, two side plates each formed integral with a half bridge member which is formed by a machining operation, such as a millling operation, with a notch affording the inner wall or walls of a pick-receiving socket of non-circular cross section, a notch-closing member accommodated in the notches so as to form the outer wall of each of said sockets and to bridge said members, and welds uniting the half bridge members and connecting the notch-closing member with the half bridge members.

2. A pick-carrying block for the cutter-chains of coal-cutting machines comprising, in combination, two side plates each formed integral with a half bridge member which is formed by a machining operation, such as a milling operation, with a notch affording the inner wall or walls of a pick-receiving socket of non-circular cross section, a V-shaped notch-closing member accommodated in the notches so as to form the outer wall of each of said sockets and to bridge said members, and welds uniting the half bridge members and connecting the notch-closing member with half bridge members.

ALEX. ANDERSON.